INVENTOR:
Sixten Englesson,
By Ernest A. Marmorek,
His Attorney.

INVENTOR:
Sixten Englesson,

United States Patent Office 3,126,029
Patented Mar. 24, 1964

3,126,029
FLUID FLOW CHECK VALVES
Sixten Englesson, Djursholm, Sweden, assignor of one-half to Aktiebolaget Flygts Pumpar, Stockholm, Sweden
Filed Dec. 4, 1961, Ser. No. 157,326
2 Claims. (Cl. 137—525.3)

The present invention relates to fluid flow check valves and has for its purpose to provide an improved valve which may be readily mounted, works silently and effectively and has a low flow resistance, and which furthermore is easy to inspect, prevents the accumulation of impurities and is designed to have a high resistance against damage and long life.

The check valve according to the invention comprising a cup-shaped element of flexible material inserted within a tube or equivalent channel, which element is rigidly secured along a portion of its periphery to the inner wall of said tube or channel by a flap engaging said wall and has a cross-section adapted to conform without stretching to the section of the tube or channel, is therefore characterized in that the free portion of the open end of said element is obliquely cut from the edge of said rigidly secured portion oppositely to the direction of fluid flow through the valve, to form said flap.

Means may also be provided within the cup shaped element for adjustably limiting the movement to the free portion of said element, so that a reduced flow area may be obtained at will. This limiting means may be rigid or flexible, and in the latter case shocks on the valve from returning water such as may occur when an object becomes wedged between the wall of the cup and the opposite side wall of the tube or channel are avoided. Preferably said limiting means comprises an adjustably inflatable bag of suitable flexible but substantially inextensible material, which bag may be filled to different degrees from the outside with compressed air or other fluid to take up a larger or smaller part of the flow area through the valve.

Some preferred embodiments of a check valve according to the invention are illustrated solely by way of example in the accompanying drawings, in which.

Figure 1:
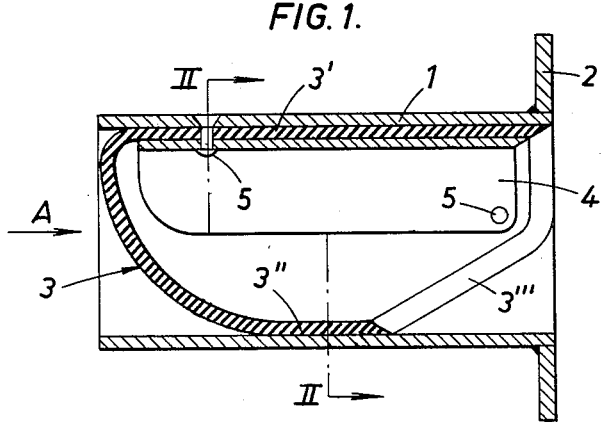
FIG. 1 is a sectional side elevation of a check valve according to the invention mounted in a flanged tube section.
Figure 2:
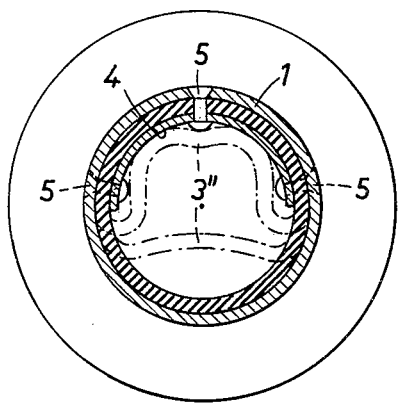
FIG. 2 is a cross-section on the line II—II of FIG. 1.

Referring to FIGS. 1 and 2, a tube section 1 is at its one end provided with a flange 2. Said tube section is adapted to be inserted in a conduit and secured between two adjacent tube flanges of the conduit. In said tube section there is inserted a cup-shaped element 3 of substantially cylindrical shape and made of flexible, preferably resilient material such as rubber. The bottom of said cup-shaped element is directed opposite to the fluid flow direction shown by the arrow A. Said bottom of the cup-shaped element is curved in the fluid flow direction from the edge rigidly secured to the tube section 1 towards the opposite free portion 3" of the cup-shaped element. The portion 3' of the cup-shaped element may be rigidly secured to the inner wall of the tube section 1 by means of a plate 4, which is inserted in the cup-shaped element and is riveted at 5 to the tube section 1. The fastening plate 4 extends over one-half of the circumference of the tube and permits the remaining portion 3" of the cup-shaped element to be urged against said fastening plate 4 by the flowing fluid, as is shown in FIG. 2, and at full current to leave a substantially free straight passageway through the tube section.

According to the invention the edge of the free portion 3" of the cup-shaped element is obliquely cut approximately to half the length of the cup-shaped element to engage tightly the inner wall of the tube section and permit the cup-shaped element to be deformed with a small resistance by the flowing fluid.

It is to be noticed that the fastening of the cup-shaped element may be carried out in several ways provided said fastening is rigid and said fastening plate 4 may advantageously be embedded in the material of the cup-shaped element.

Figure 3:
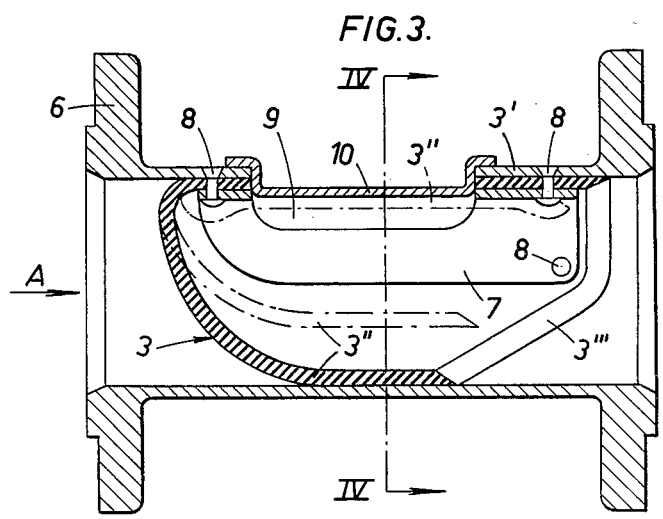
FIG. 3 is a sectional side elevation of a modified embodiment of a check valve according to the invention.
Figure 4:
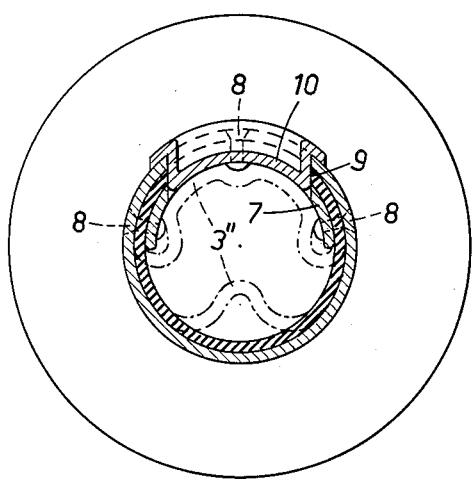
FIG. 4 is a cross-section on the line IV—IV of FIG. 3.

In FIG. 3 there is shown a modified embodiment of a check valve according to the invention, and the cup-shaped element 3 is secured to a tube section 6 having flanges at both ends, for mounting in a tube conduit.

The cup-shaped element 3 is secured to the inner wall of the tube section by means of a rigid plate 7 and rivets 8. The cup-shaped element has the same form as that shown in FIG. 1 irrespective of the fact that an aperture or opening 9 is provided in the tube section 6, the fastened portion 3' of the cup-shaped element and the fastening plate 7. A cover 10 closes tightly said opening 9. When removing the cover 10, which is made to be readily removable, the interior of the check valve may be inspected and cleaned when necessary without any need for disconnecting the conduit.

In accordance with the invention the cup-shaped element may be mounted in the conduit in different manners and may even be entirely removable from the conduit through a suitable opening in the side wall thereof. Further, the check valve is not limited to a conduit of circular cross-section but may be mounted in conduits of different types. When mounted in a vertical conduit with downward direction of flow there is practically no risk of the accumulation of impurities, and apart from this the said impurities may easily pass the free portion of the cup-shaped element.

The material of said cup-shaped element is suitably reinforced to obtain sufficient strength against the pressure of the fluid in the closed position of the valve. Further, the material of said cup-shaped element should be pliable to reduce the necessity for an absolutely smooth engaging surface.

Figure 5:
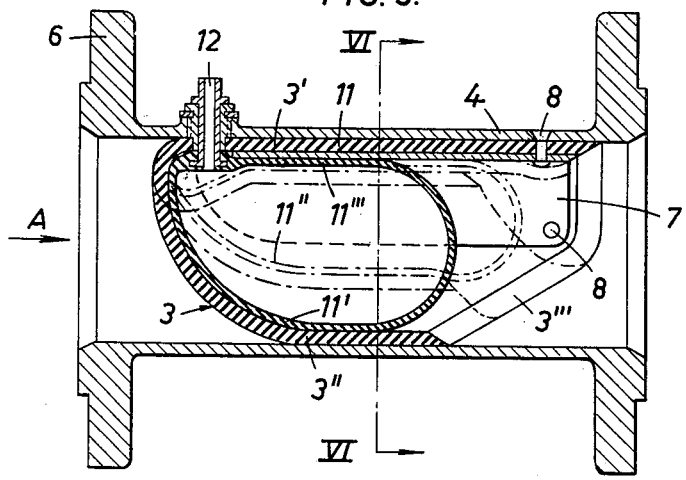
FIG. 5 is a sectional side elevation of a check valve according to the invention provided with flow area limiting means.
Figure 6:
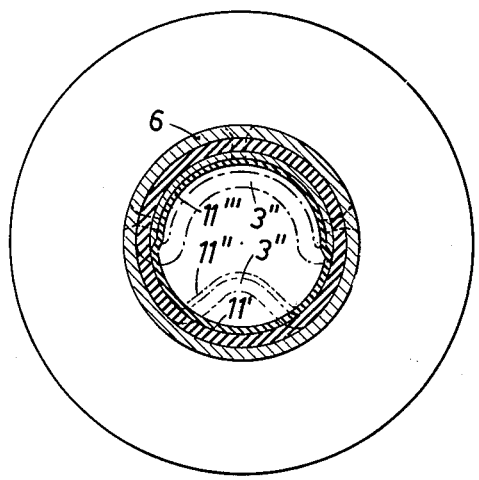
FIG. 6 is a cross-section on the line VI—VI of FIG. 5.

Referring now to FIGS. 5 and 6, a cup-shaped element 3 is secured in the same manner as previously described to the inner wall of the tube section 6 (compare FIG. 3).

In order to control the flow area through the valve a bag 11 of flexible material such as reinforced rubber is provided within the cup-shaped element 3 and has a nozzle 12 penetrating through the wall of the tube section. The bag 11, which for certain purposes may also have some resiliency, is connected through the nozzle 12 with a pneumatic or hydraulic pressure source through a suitable control device, by means of which the filling of the bag may be regulated so that it limits the movement of the free wall of the cup-shaped element 3 to obtain a desired flow area. In the figures the bag 11 is shown in three different positions 11', 11" and 11'" respectively, and in position 11' the channel is completely closed while in the position 11'" a completely free flow area is obtained.

Although a single embodiment of the control means according to the invention is shown and described it is possible to arrange other types of limiting means within the scope of the invention, such as mechanical means, including screws and other elements adjustable from the outside.

I claim:
1. A fluid flow check valve comprising the combination with a tube of a bag-shaped element of flexible material inserted in said tube and being rigidly secured to the inner wall of the same along a portion of its peripheral area extending about one-half of its periphery and from the opening of the bag to its bottom, said bottom being rounded and said opening being obliquely cut from that edge of said opening secured to the tube wall towards said bottom of the bag.
2. A fluid flow check valve comprising the combination with a tube element of a bag-shaped element of flexible material inserted in said tube element and being rigidly secured to the inner wall of the same along a portion of its peripheral area, an aperture defined in the wall of said tube element and extending through said bag-shaped element within said peripheral area, a cover tightly secured to said aperture, said bag having a rounded bottom and an opening obliquely cut from that edge of said opening secured to the wall of the tube element towards said bottom of the bag.

References Cited in the file of this patent
UNITED STATES PATENTS

| | | |
|---|---|---|
| 155,668 | Painter | Oct. 6, 1874 |
| 201,880 | Johnson | Apr. 2, 1878 |
| 2,676,609 | Pfarrer | Apr. 27, 1954 |
| 2,684,049 | Hollis | July 20, 1954 |
| 2,881,795 | Waldenmaier | Apr. 14, 1959 |